US006937254B2

(12) United States Patent
Nishiyama et al.

(10) Patent No.: US 6,937,254 B2
(45) Date of Patent: Aug. 30, 2005

(54) GRAPHICAL USER INTERFACE FOR SEARCHES

(75) Inventors: Akio Nishiyama, Asaka (JP); Mika Sugimoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 71 days.

(21) Appl. No.: 10/387,527

(22) Filed: Mar. 14, 2003

(65) Prior Publication Data

US 2003/0174173 A1 Sep. 18, 2003

(30) Foreign Application Priority Data

Mar. 15, 2002 (JP) ....................................... 2002-071239

(51) Int. Cl.[7] .......................... G09G 5/00; G06T 11/20; G06F 3/00; G06F 9/00; G06F 17/00

(52) U.S. Cl. ....................... 345/619; 345/440; 345/660; 345/663; 715/856

(58) Field of Search ................................. 345/660, 661, 345/786, 787, 784, 781, 799, 630, 681, 684, 689, 666, 687, 665, 688, 619, 440, 663, 672, 676, 680; 715/700, 517, 518, 519, 856

(56) References Cited

U.S. PATENT DOCUMENTS 5,526,018 A * 6/1996 Fisher ........................ 345/668
5,546,516 A * 8/1996 Austel et al. ............... 345/440
5,818,415 A * 10/1998 Shirakawa .................. 345/442
5,894,311 A * 4/1999 Jackson ...................... 345/440
6,061,062 A * 5/2000 Venolia ...................... 715/856
2004/0160416 A1 * 8/2004 Venolia ...................... 345/157

* cited by examiner

*Primary Examiner*—Sumati Lefkowitz
*Assistant Examiner*—Chante Harrison
(74) *Attorney, Agent, or Firm*—Birch, Stewart, Kolasch & Birch, LLP.

(57) ABSTRACT

Operability of an image database is improved. To achieve this, a manipulator is displayed on a horizontal axis at the center thereof. If the manipulator is dragged upward or downward, the scale of graduations on the horizontal axis is enlarged or reduced (e.g., month of photography becomes year of photography or day of photography). If the manipulator is dragged rightward or leftward, the values of the graduations on the horizontal axis increase or decrease (e.g., from January to December, 2000, to either January to December, 2001 or January to December, 1999). If a search command is applied, images that fall within a search range the graduations of which have been changed are searched. Merely dragging the manipulator makes it possible to change not only the values of the graduations but also the scale thereof.

4 Claims, 5 Drawing Sheets

GRAPHICAL USER INTERFACE FOR SEARCHES

BACKGROUND OF THE INVENTION

1. Field of the Invention

This invention relates to a graphical user interface for searches.

2. Description of the Related Art

When a window is displayed on the display screen of the display unit of a personal computer, there are instances where a scroll bar is displayed along one edge of the window. If information such as images and text cannot all be displayed in the window, scrolling is performed by dragging a slider along the scroll bar so that information that could not be displayed in the window will be displayed in the window.

There are instances where such a scroll bar is utilized in an image database that displays images, which have been retrieved as the result of a search, in the form of a list of arrayed thumbnail images. Specifically, the scroll bar is provided with graduations and the scope of a search (which becomes a search condition) is specified in accordance with the position of the slider along the scroll bar.

Since the scroll bar is one-dimensional, the scope of a search can be changed by moving the scroll-bar slider but this does make it possible to alter the scale of the graduations. As a consequence, operability is poor. In order to change both, the search scope and scale of the graduations, two scroll bars are required. However, operability is not improved that much even if this expedient is adopted.

SUMMARY OF THE INVENTION

Accordingly, an object of the present invention is to improve operability.

A graphical user interface for searches, comprising a first display controller (first display control means) for controlling a display device so as to display, on a display screen, a coordinate axis along which graduations have been formed, an area that displays results of a search of information of interest that falls within a search range set in conformity with the graduations, and a manipulator located at a reference position on the coordinate axis; a move-command device (move-command means) for applying a horizontal- or vertical-direction move command to the manipulator; and a second display controller (second display control means) for controlling display of the coordinate axis in such a manner that scale of the graduations is changed in response to application of either one of the horizontal- and vertical-direction move commands from the move-command device to the manipulator, and in such a manner that values of the graduations are changed in response to application of the other one of the horizontal- and vertical-direction move commands from the move-command device to the manipulator.

A method of controlling the above-described graphical user interface for searches also is provided. Specifically, the method comprises the steps of displaying, on a display screen, a coordinate axis along which graduations have been formed, an area that displays results of a search of information of interest that falls within a search range set in accordance with the graduations, and a manipulator located at a reference position on the coordinate axis; and controlling display of the coordinate axis in such a manner that scale of the graduations is changed in response to application of either one of the horizontal- and vertical-direction move commands to the manipulator, and in such a manner that values of the graduations are changed in response to application of the other one of the horizontal- and vertical-direction move commands to the manipulator.

In accordance with the present invention, the coordinate axis along which the graduations are formed, the area for displaying search results and the manipulator are displayed on the display screen of a display device. If a command for moving the manipulator in either the horizontal or vertical direction is applied to the manipulator, the scale of the graduations changes. If a command for moving the manipulator in the other of the horizontal and vertical directions is applied to the manipulator, the values of the graduations change (without a change in the scale of the graduations). By applying the horizontal- and vertical-move commands to move the manipulator horizontally and vertically, both the scale of the graduations and the values of the graduations can be changed. This improves operability.

The search range may be predetermined or may be changeable by the user. If the search is a search of an image database, then the search results may be such that thumbnail images are displayed in the search-result display area. Alternatively, names of images files may be displayed in the search-result display area.

The manipulator may be such that it moves away from the reference position in accordance with the move command provided by the move-command device. In such case, the second display controller would control the display of the coordinate axis in such a manner that the scale of the graduations and values of the graduations change in accordance with distance of the manipulator from the reference position.

The graphical user interface may further comprise a third display controller (third display control means) for controlling display in the search-result display area so as to display results of the search of information of interest that falls within the search range after display of the coordinate axis is controlled by the second display control device.

Thus, the search range (search condition) is changed in accordance with the changed scale and/or values of the graduations. The search of the subject matter is conducted depending upon the changed search range.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
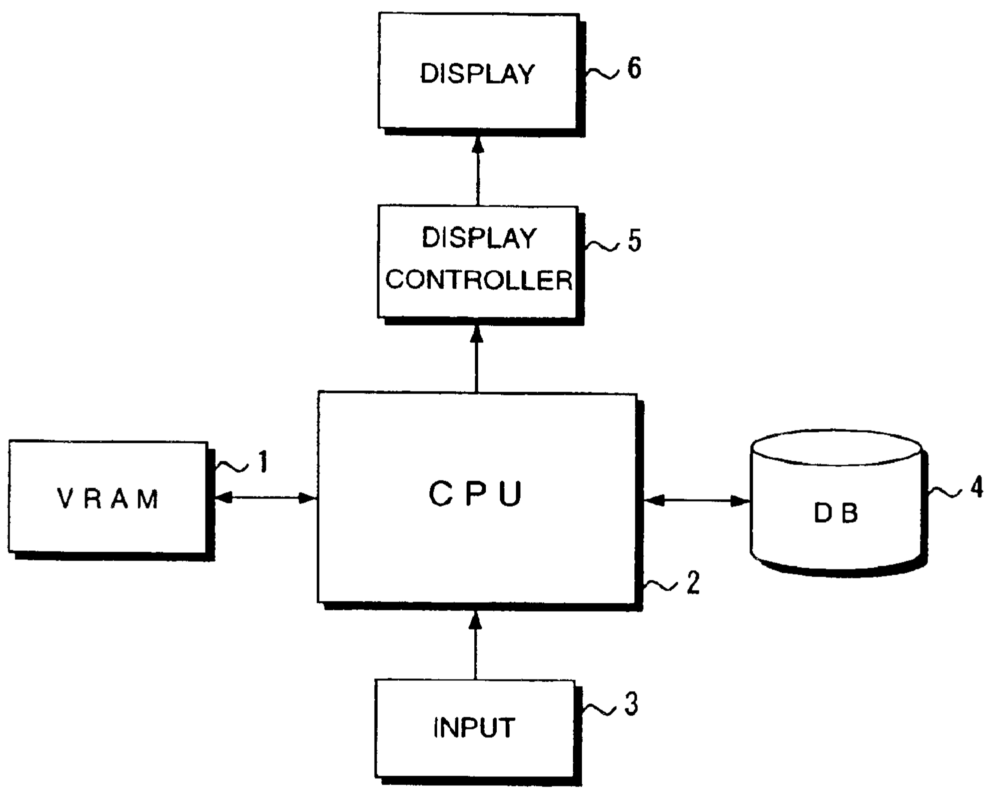
FIG. 1 is a block diagram illustrating the electrical structure of an image database apparatus.

FIG. 1 is a block diagram illustrating the electrical structure of an image database apparatus according to a preferred embodiment of the invention.

The overall operation of the image database apparatus is controlled by a CPU 2.

The image database apparatus includes an image database 4 in which image data representing a number of images has been stored. Data representing the characteristics of the image data also has been stored in the image database 4 in association with the stored image data. The characteristics of the image data includes image lightness, image date of photography, image saturation and percentage of colors in an image.

An input unit 3 includes a keyboard and mouse, etc. The input unit 3 outputs signals such as a signal for dragging a cursor and a signal obtained by clicking the mouse. These signals enter a CPU 2.

Also connected to the CPU 2 is a VRAM (Video Random-Access Memory) 1 that temporarily stores image data representing an image displayed on the display screen of a display unit 6.

Display of images by the display unit 6 is controlled by a display control unit 5.

Figure 2:
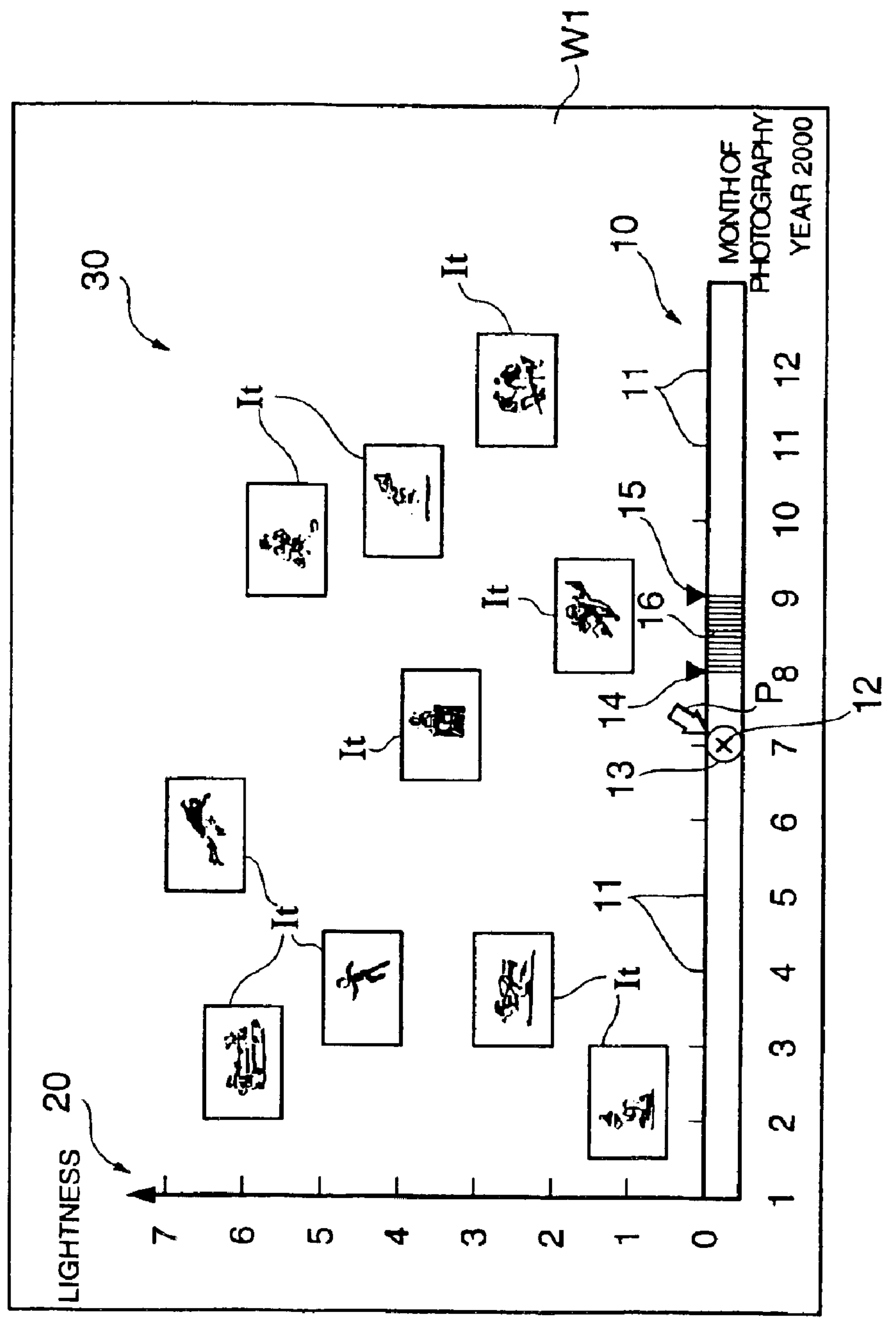
FIG. 2 is a diagram illustrating an example of a window displayed on the display screen.

FIG. 2 illustrates an example of a window W1 displayed on the display screen of the display unit 6.

The window W1 includes a search-result display area 30 for displaying thumbnail images 40 that have been retrieved as the result of a search. A horizontal axis 10 and a vertical axis 20 are displayed in the search-result display area 30. The horizontal axis 10 indicates month of photography, which ranges from January to December of 2000, and the vertical axis indicates image lightness, which ranges from 0 to 7.

The horizontal axis 10 is provided with graduations 11 (numerals such as of the months of photography may serve as the graduations). Displayed at the center (reference position) of the horizontal axis 10 is a manipulator 13 that is moved freely up and down and to the left and right by being dragged using a pointer P moved by the mouse. Further, displayed on the horizontal axis 10 are a left cursor 14 and a right cursor 15 freely movable to the left and right in a manner similar to the manipulator 13. A range delimited by the left cursor 14 and right cursor 15 is a search range 16. Images that fall within the search range 16 (in the example of FIG. 2, these images were obtained by photography performed in August, 2000, and therefore the search range 16 can be construed as indicating a search condition) are found from the image database 4 by conducting a search, and the corresponding thumbnail images 40 are displayed at corresponding positions defined by the vertical axis 20 and horizontal axis 10 in the search-result display area 30.

In this embodiment, both the scale and the values of the graduations 11 along the horizontal axis 10 are changed by dragging the manipulator 13. By changing the graduations 11, images that fall within the search range 16 defined by the changed graduations 11 are the ones found by searching the image database 4.

FIGS. 3A to 3D illustrate the horizontal axis 10 with the manipulator 13, which has been dragged.

Figure 3A:
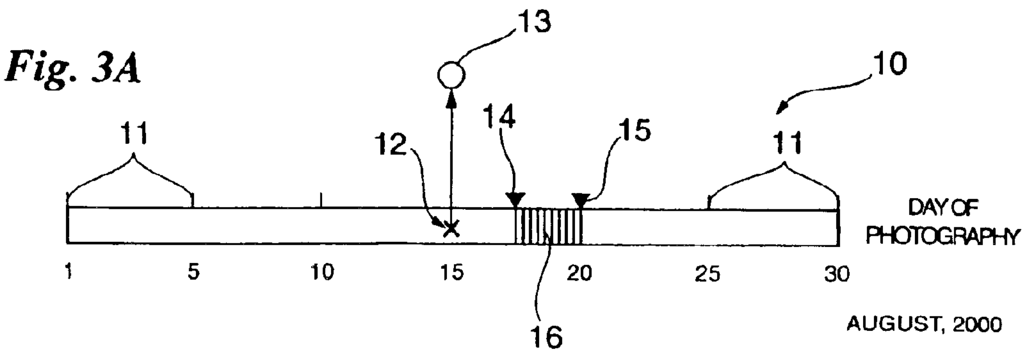
FIGS. 3A to 3D illustrate a horizontal axis displayed in the window.

FIG. 3A shows the manipulator 13 dragged upward.

When the manipulator 13 is dragged upward, the scale of the graduations 11 along the horizontal axis 10 (namely the size of the range indicated between graduations 11) is reduced in comparison with the scale of the graduations before the manipulator 13 was dragged. If, when the horizontal axis 10 is indicating month of photography as depicted in FIG. 2, the manipulator 13 is dragged upward and a search command is applied from the input unit 3 with the manipulator 13 having thus been dragged upward, then the graduations 11 on the horizontal axis 10 come to indicate day of photography (days of photography in August, 2000). The horizontal axis 10 now is such that the search range 16 becomes a range indicated by the new graduations 11 on horizontal axis 10. Since the range of photography in FIG. 2 is August, 2000, the days of the month of August, 2000 become the range of the new graduations 11 in FIG. 3A. Images within the search range (Aug. 17, to Aug. 20, 2000) 16 defined by the graduations 11 of reduced scale are searched for in the image database 4. Thumbnail images 40 corresponding to the images retrieved by the search are displayed in the search-result display area 30. That is, from among the image data that has been stored in the image database 4, thumbnail images 40 corresponding to the images represented by the image data obtained by photography between Aug. 17 and Aug. 20 of 2000 are displayed in the search-result display area 30.

Figure 3B:
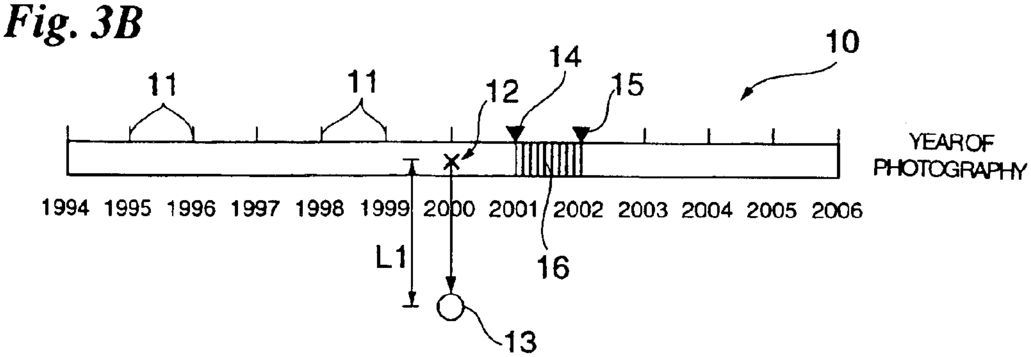

FIG. 3B shows the manipulator 13 dragged downward.

When the manipulator 13 is dragged downward, the scale of the graduations 11 along the horizontal axis 10 is enlarged. If the manipulator 13 is dragged downward when the horizontal axis 10 is indicating month of photography as depicted in FIG. 2, the graduations 11 on the horizontal axis 10 come to indicate year of photography (years from 1994 to 2006). Images within the search range (1994 to 2006) 16 defined by the graduations 11 of enlarged scale are searched for in the image database 4, and thumbnail images 40 corresponding to the images retrieved by the search are displayed in the search-result display area 30.

It may be so arranged that if the manipulator 13 has been dragged, then the greater the distance L1 between the manipulator 13 and the center 12 of the horizontal axis 10 becomes, the more the scale of the changed graduations 11 is enlarged, and the smaller the distance L1 becomes, the more the scale of the changed graduations 11 is reduced.

Figure 3C:
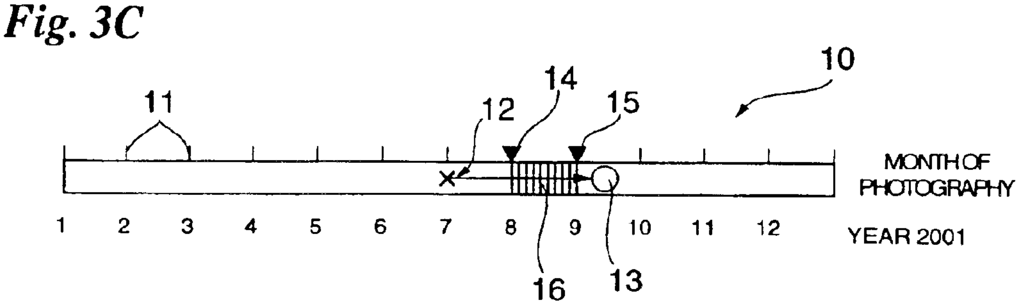

FIG. 3C shows the manipulator 13 dragged rightward.

If the manipulator 13 is dragged to the right, the values of the graduations 11 on horizontal axis 10 become larger without any change in the scale of the graduations 11 on horizontal axis 10. If the manipulator 13 is dragged to the right when values of graduations 11 of from January to December of year 2000 are being displayed on the horizontal axis 10, as illustrated in FIG. 2, then values of graduations 11 of from January to December of year 2001 will be displayed on horizontal axis 10. An image search is conducted based upon the search range 16 of the new graduations 11.

Figure 3D:
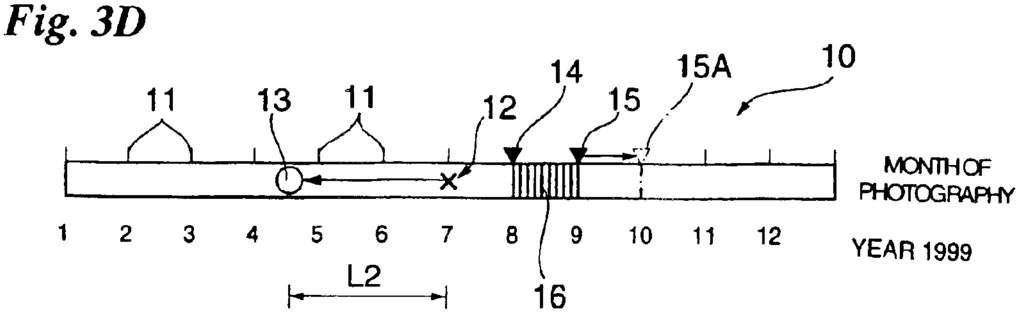

FIG. 3D shows the manipulator 13 dragged leftward.

If the manipulator 13 is dragged to the left, the values of the graduations 11 on horizontal axis 10 become smaller without any change in the scale of the graduations 11 on horizontal axis 10. If the manipulator 13 is dragged to the left when values of graduations 11 of from January to December of year 2000 are being displayed on the horizontal axis 10, as illustrated in FIG. 2, then values of graduations 11 of from January to December of year 1999 will be displayed on horizontal axis 10. An image search is conducted based upon the search range 16 of the new graduations 11.

It may be so arranged that if the manipulator 13 has been dragged leftward or rightward, then the greater the distance L2 between the manipulator 13 and the center 12 of the horizontal axis 10 becomes, the more the values of the changed graduations 11 are enlarged, and the smaller the distance Lw becomes, the more the values of the changed graduations 11 are reduced.

Further, the search range 16 can be changed by dragging the left cursor 14 or right cursor 15. For example, the search range 16 is widened (from August to September, 1999) by dragging the right cursor 15 to the position of a right cursor 15A, as shown in FIG. 3D. A search of images obtained by photography performed within this range is conducted by applying a search command.

Figure 4:
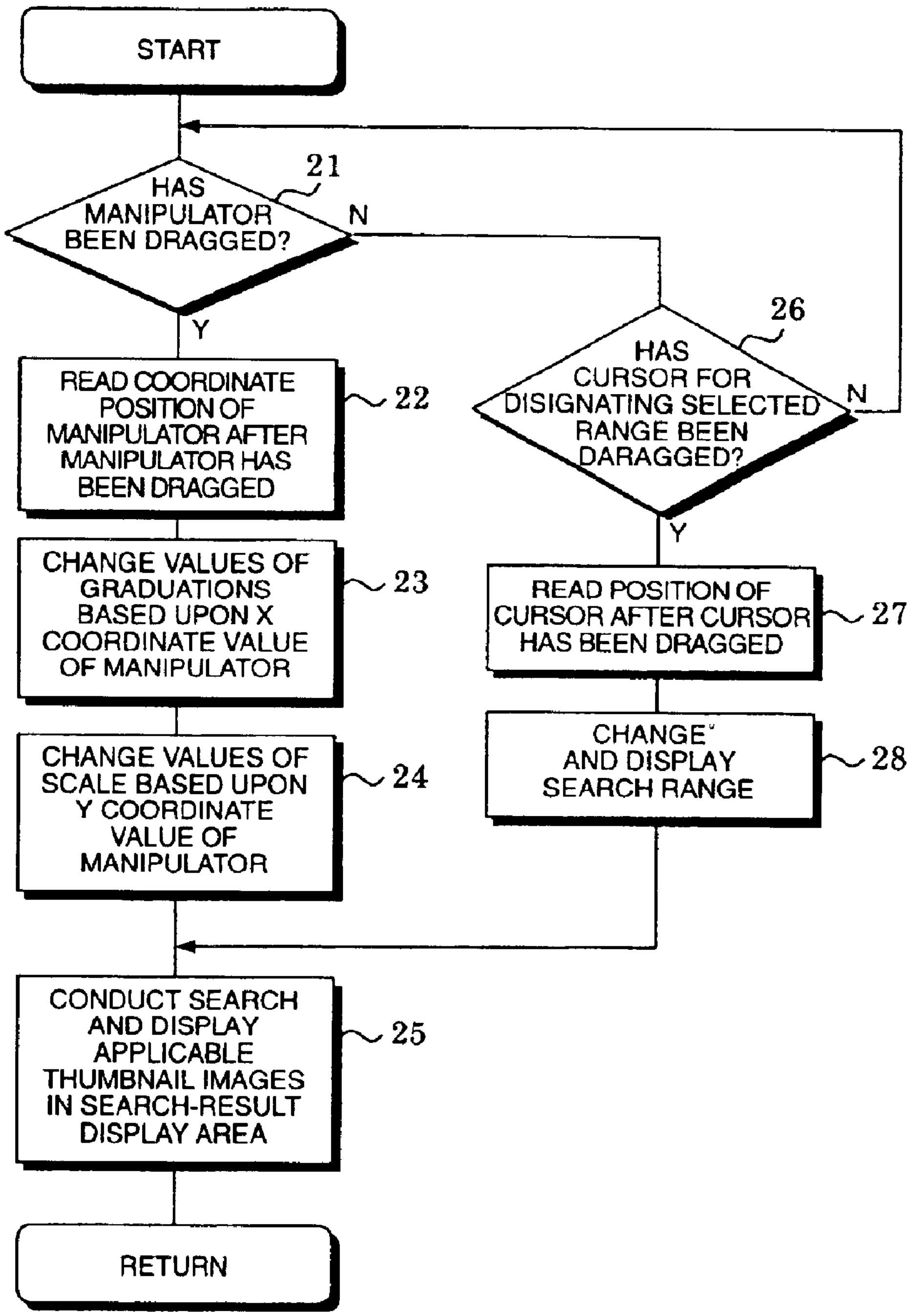
FIG. 4 is a flowchart illustrating processing executed by the image database apparatus.
Figure 5:
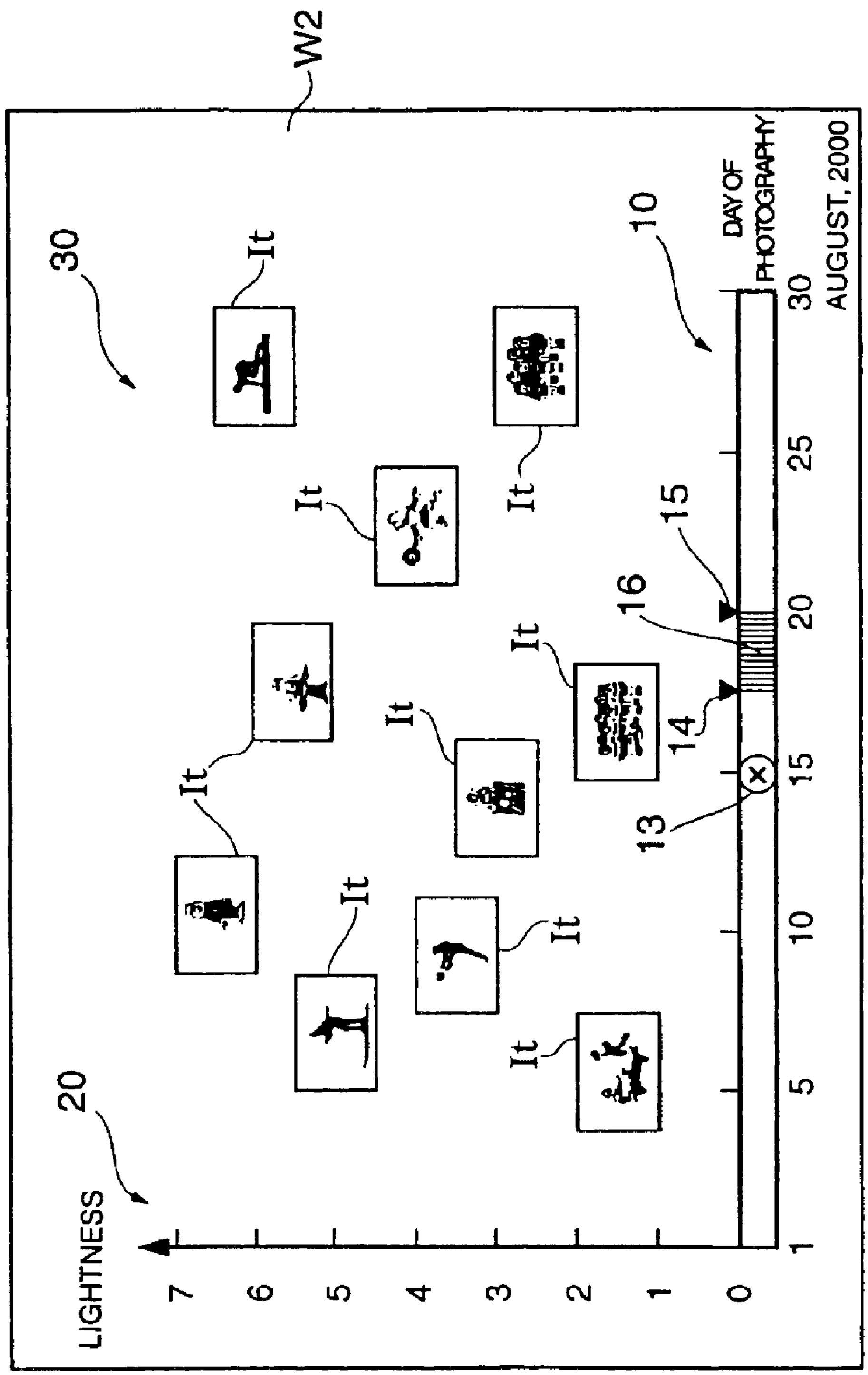
FIG. 5 is a diagram illustrating an example of a window displayed on the display screen.

FIG. 4 is a flowchart illustrating processing executed by the image database apparatus, and FIG. 5 shows an example of a window W2 displayed on the display screen of the display unit 6.

It will be assumed that the window W1 shown in FIG. 2 is being displayed on the display screen of the display unit 6.

If the manipulator 13 is dragged by the operator of the image database apparatus ("YES" at step 21), the image database apparatus responds to a search command, which is applied from the input unit 3, by reading the coordinate position of the manipulator 13 after it has been dragged (step 22). The center 12 of the horizontal axis 10 is adopted as the origin of the coordinate system.

When the coordinate position is read, the values of the graduations 11 change based upon the X-coordinate value (the distance from the center 12) read (step 23). As mentioned above, the values increase if the X-coordinate value is positive and decrease if the X-coordinate position is negative. Further, the amount of change increases if the X-coordinate value increases and decreases if the X-coordinate value decreases.

Next, the scale of the graduations changes based upon the read Y-coordinate value (distance from the center 12) (step 24). In this case also the scale increases if the Y-coordinate value is positive and decreases if the Y-coordinate position is negative. Further, the amount of change increases if the Y-coordinate value increases and decreases if the Y-coordinate value decreases.

A search is conducted in the search range 16 that has been set and thumbnail images 40 corresponding to images that fall within the search range 16 are displayed in the search-result display area 30 (step 25). For example, if the manipulator 13 is dragged upward, the window W2 in which the scale of the graduations 11 has been enlarged as shown in FIG. 5 will be displayed on the display screen of the display unit 6 by a new search.

If the manipulator 13 is not dragged ("NO" at step 21) but the cursor (left cursor 14 or right cursor 15) for designating a selected range is dragged ("YES" at step 26), then the position of the left cursor 14 or right cursor 15 will be read (step 27). The search range 16 changes in size in accordance with the left cursor 14 or right cursor 15 and is displayed on the horizontal axis 10 (step 28).

In this case also the images that fall within the new search range 16 are searched for in the image database 4 in response to a search command from the input unit 3 and are displayed in the search-result display area 30 (step 25).

In the above embodiment, the manipulator 13 is dragged using the mouse. However, if the image database apparatus according to this embodiment is utilized in a PDA (Personal Digital Assistant) or the like, the manipulator 13 would be dragged utilizing a pen device.

Further, it may be so arranged that thumbnail images of representative images from among the images retrieved by a search are displayed in the search-result display area 30 and an image from among these representative thumbnail images is specified by the operator, whereby thumbnail images corresponding to images that resemble this specified image are displayed in the search-result display area 30.

It may be so arranged that a program for causing a computer apparatus to perform the above operation is created. In such case the program would be stored on a recording medium such as a CD-ROM (Compact Disk—Read-Only Memory). In a case where the program is stored on a recording medium, the image database apparatus is provided with a reading unit for reading the program stored on the recording medium.

Furthermore, the foregoing embodiment has been described with regard to an image database for searching images. However, it goes without saying that not only images but other information may be searched. Further, a change in the graduations of the coordinate axis is not limited to a change in date of photography. The change in graduations may relate to other information, lightness or saturation regarding images.

As many apparently widely different embodiments of the present invention can be made without departing from the spirit and scope thereof, it is to be understood that the invention is not limited to the specific embodiments thereof except as defined in the appended claims.

What is claimed is:

1. A graphical user interface for searches, comprising:

a first display controller for controlling a display device so as to display, on a display screen, a coordinate axis along which graduations have been formed, a search-result display area that displays results of a search of information of interest that falls within a search range set in conformity with the graduations and set as a part of the coordinate axis, and a manipulator located at a reference position on the coordinate axis;

a move-command device for applying a horizontal- or vertical-direction move command to the manipulator; and a second display controller for controlling display of the coordinate axis in such a manner that scale of the graduations is changed in response to application of either one of the horizontal- and vertical-direction move commands from the move-command device to the manipulator, and in such a manner that values of the graduations are changed in response to application of the other one of the horizontal- and vertical-direction move commands from the move-command device to the manipulator.

2. The graphical user interface according to claim 1, wherein the manipulator moves away from the reference position in accordance with the move command provided by said move-command device;

second display controller controlling the display of the coordinate axis in such a manner that the scale of the graduations and values of the graduations change in accordance with distance of the manipulator from the reference position.

3. The graphical user interface according to claim 2, further comprising a third display controller for controlling display in the search-result display area so as to display results of the search of information of interest that falls within the search range after display of the coordinate axis is controlled by said second display control device.

4. The graphical user interface according to claim 1, wherein the display portion of the search range can be changed.

* * * * *